United States Patent [19]

Kushibiki et al.

[11] Patent Number: 4,783,153
[45] Date of Patent: Nov. 8, 1988

[54] VARIABLE-FOCUS OPTICAL DEVICE

[75] Inventors: Nobuo Kushibiki, Ebina; Noriyuki Nose, Sagamihara; Takeshi Baba, Atsugi; Toshiyuki Nakajima, Atsugi; Masahiro Okuda, Atsugi, all of Japan

[73] Assignee: Canon Kabushiki Kaisha, Tokyo, Japan

[21] Appl. No.: 942,791

[22] Filed: Dec. 17, 1986

[30] Foreign Application Priority Data

Dec. 24, 1985 [JP] Japan ............................ 60-289191

[51] Int. Cl.$^4$ ............................ G02B 3/00; G02B 1/06; G02B 15/00
[52] U.S. Cl. ............................ 350/409; 350/418; 350/419; 350/423
[58] Field of Search ............... 350/423, 409, 419, 418, 350/413

[56] References Cited

U.S. PATENT DOCUMENTS

| | | | |
|---|---|---|---|
| 4,097,126 | 6/1978 | Mahlein et al. | 350/16 X |
| 4,289,379 | 9/1981 | Michelet | 350/419 |
| 4,407,567 | 10/1983 | Michelet et al. | 350/419 X |
| 4,514,048 | 4/1985 | Rogers | 350/423 |
| 4,712,882 | 12/1987 | Baba et al. | 350/413 |

FOREIGN PATENT DOCUMENTS

| | | | |
|---|---|---|---|
| 0201207 | 12/1982 | Japan | 350/422 |
| 0084502 | 5/1985 | Japan | 350/423 |

OTHER PUBLICATIONS

Caudell et al., "Active Optics with RTV Silicone Rubber & SPIE, vol. 115, Advances in Replicated & Plastic, pp. 18–24.

*Primary Examiner*—John K. Corbin
*Assistant Examiner*—Ronald M. Kachmavik
*Attorney, Agent, or Firm*—Fitzpatrick, Cella, Harper & Scinto

[57] ABSTRACT

A variable-focus optical device comprises an elastomeric member having a gradient of shear modulus along its optical axis, and a deforming member having an aperture adapted for causing projection or sinking of the elastomeric member therethrough or thereat to deform the surface of the elastomeric member. The gradient of shear modulus is preferably one of continuously decreasing from the surface toward the inside of the elastomeric member. The gradient of shear modulus is provided by a concentration gradient of an inorganic substance such as silica dispersed in an elastomeric substance such as polysiloxane.

12 Claims, 1 Drawing Sheet

VARIABLE-FOCUS OPTICAL DEVICE

FIELD OF THE INVENTION AND RELATED ART

The present invention relates to a variable-focus optical device capable of changing the focal length through deformation of an optical surface.

Heretofore, as variable-focus or variable-focal-length lenses, a container of an elastic body filled with liquid which is changed in shape by its liquid pressure, as disclosed in Japanese Laid-Open Patent Application No. 36857/1980, and a lens with the use of a piezoelectric member, as disclosed in Japanese Laid-Open Patent Application Nos. 110403/1981 and 85415/1983, have been proposed. However, the so-called liquid lens of the former one additionally requires a liquid reservoir and a pressurizing means, which pose a difficulty in making an device compact and also a difficulty that it causes a large surface deformation due to gravity and vibration, while the latter has a drawback that the variable range cannot be so great.

In order to obviate the above difficulties, there has been proposed a variable-focus optical device wherein an elastic or elastomeric member is caused to project or sink through an aperture or opening to arbitrarily deform an optical surface formed by the elastomeric member at the aperture, thereby to obtain a desired focal length (Japanese Laid-Open Application No. 84502/1985).

The optical device however involves a problem that a larger deformation is liable to occur in the neighborhood of the periphery of the aperture than in the neighborhood of the aperture center, e.g., because of stress concentration near the aperture periphery. As a result, a nonspherical surface having a larger curvature near the aperture periphery is formed, so that it is difficult to provide a desired surface deformation, thus failing to provide desired optical characteristics.

SUMMARY OF THE INVENTION

In view of the problems as described above, a principal object of the present invention is to provide a variable focus optical device capable of constantly retaining a spherical surface or a desired aspherical surface during deformation.

According to the present invention, there is provided a variable-focus optical device comprising an elastomeric member having a gradient of shear modulus inside thereof along its optical axis direction, and a deforming member having an aperture adapted for causing projection or sinking of the elastomeric member therethrough or thereat.

DETAILED DESCRIPTION OF PREFERRED EMBODIMENTS

Figure 1:
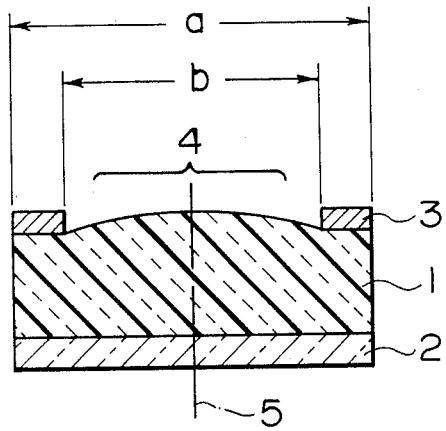
FIG. 1 is a schematic sectional view illustrating an embodiment of the variable-focus optical device according to the present invention.

Referring to FIG. 1, there is shown an embodiment of the variable-focus optical device according to the present invention, which comprises an elastic or elastomeric member 1, an optionally provided supporting plate 2 of, e.g., glass, an aperture plate 3, as a deforming member or a deformation causer, having an aperture 4 for causing deformation of the elastomeric member 1, and an optical axis center 5.

Figure 2:
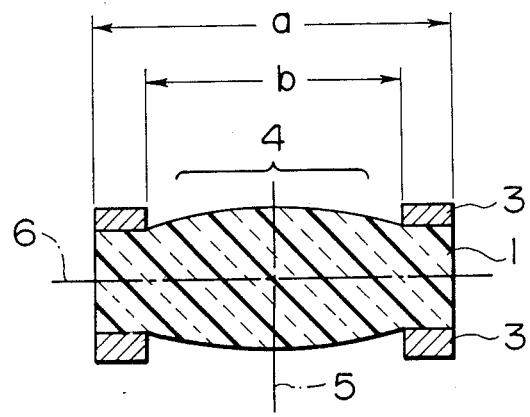
FIG. 2 is a schematic sectional view illustrating another embodiment of the variable-focus optical device according to the present invention.

The elastomeric member 1 has a gradient of shear modulus therein along the optical axis 5. The gradient of shear modulus may preferably be a continuous one with a shear modulus gradually changing along the optical axis in the elastomeric member. In this embodiment, the elastomeric member has a continuous gradient of shear modulus which decreases from a maximum shear modulus at the surface thereof exposed at the aperture 4 with a gradual decrease toward the supporting plate 2. The elastomeric member 1 is preliminarily formed in the shape of a convex lens in this embodiment, but the shape thereof is not particularly limited. More specifically, the elastomeric member 1 may take an arbitrary original shape such as a flat plate or a concave lens in addition to the above. The gradient of shear modulus to be provided may depend on the shape of a variable-focus optical device desired and may be a continuously changing one unidirectionally along the optical axis 5 as in this embodiment. Alternatively, in a case where a variable-focus optical device as shown in FIG. 2 comprising an elastomeric member 1 and a pair of aperture plates 3 sandwiching the elastomeric member 1 in the direction of an optical axis 5 is desired for example, the elastomeric member 1 may have such a gradient that it has a larger shear modulus in the neighborhood of both aperture plates 3 and a smaller shear modulus in the neighborhood of a thickness center line 6. In this case, the shear modulus at both surfaces in the neighborhood of the aperture plates may be the same or different.

The variable-focus optical device shown in FIG. 1 is similar to one disclosed in the above mentioned Japanese Laid-Open Patent Application No. 84502/1985 except that the elastomeric member 1 has a gradient of shear modulus as described above.

In order to operate the optical device, the aperture plate 3 is moved along the optical axis 5 so as to change the surface shape of the elastomeric member 1 by causing the elastomeric member 1 to project or sink through the aperture 4 of the aperture plate 3, thereby to obtain a desired focal length. When the elastomeric member is caused to project, the aperture plate 3 is moved along the optical axis 5 toward the supporting plate 2 to press the elastomeric member 1. On the other hand, when the elastomeric member 1 is caused to sink, the aperture plate 3 is moved upward to exert a negative pressure to the elastomeric member 1. The optical device shown in FIG. 2 may be operated similarly as the one shown in FIG. 1 by moving at least one of the aperture plates 3 along the optical axis to change the relative position of the aperture plates 3. The shear modulus of the elastomeric member 1 may preferably be in the range of $10^4$–$10^8$ dyne/$cm^2$, further preferably in the range of $10^4$–$10^7$ dyne/$cm^2$ Accordingly, the shear modulus gradient of the elastomeric member 1 may preferably be provided in the above ranges.

The shear modulus (or modulus of rigidity) used herein may be defined as a shear modulus measured by using a rheometer comprising a pair of circular plates or a combination of a circular plate and a cone (ASTM D-4065). A commercially available example of such a rheometer is Universal Rheometer RDS 700 mfd. by Rheometrics Co.

Incidentally, an optical device is used at room temperature in most cases but may also be used at an elevated temperature or a lower temperature, so that the above mentioned ranges of shear modulus for the present invention are defined at a temperature at which the optical device is used.

Now, the significance of the shear modulus gradient is supplemented to some extent. In a variable-focus optical device using an elastomeric member which does not have a shear modulus gradient as described above but has an internally uniform shear modulus, a large degree of deformation is liable to occur near the periphery of the aperture 4 and only a smaller deformation is caused near the optical axis 5 as described above. As a result, the surface of the elastomeric member 1 becomes a nonspherical surface having a larger curvature near the periphery of the aperture, so that it is difficult to obtain a spherical or aspherical surface having a desired curvature.

In contrast thereto, such a difficulty can be obviated according to the variable-focus optical device according to the present invention. The reason for this has not been fully clarified but may be considered as follows. In the variable-focus optical device according to the present invention, the elastomeric member 1, as explained with reference to the embodiment shown in FIG. 1, has such a shear modulus gradient that the shear modulus becomes larger as it goes closer to the surface at the aperture, so that the entire energy for deformation can be minimized when the free energy change of a portion in the vicinity of the surface of the elastomeric member 1 at the aperture 4 is made as small as possible. For this reason, when the elastomeric member 1 is supplied with a positive pressure or a negative pressure by the action of the aperture plate 4, the surface portion of the elastomeric member 1 has a tendency to cause a smaller deformation at a portion close to the periphery of the aperture 4 having a larger area and a larger deformation at a portion close to the optical axis 5. As a result, the surface portion of the elastomeric member 1 receives such a deformation as to provide a nonspherical surface having smaller curvature near the periphery and a larger curvature near the optical axis 5 depending on the internal shear modulus gradient, whereby in the elastomeric member as a whole, the above mentioned undesirable deformation providing a nonspherical surface having a larger curvature at the periphery is neutralized. As an overall result, it is possible to obtain a variable-focus optical device which can deform while retaining a spherical or a desired aspherical surface.

Further, a smaller gradient of shear modulus functions to provide a larger curvature at a portion near the periphery, and a larger gradient functions to provide a smaller curvature near the periphery. Accordingly, it is possible to provide a variable-focus optical device capable of causing deformation while retaining a spherical or a desired aspherical surface, e.g., by providing a smaller shear modulus gradient when a spherical or aspherical surface having a larger curvature as a whole is desired or by providing a larger shear modulus gradient in order to obtain a spherical or aspherical surface having a smaller curvature as a whole.

It is required for the elastomeric member having a shear modulus gradient in the optical axis direction to have not only a property of causing a shape change through a strain in response to an applied stress but also a reversibility to restore the original shape through release of the strain when the stress is removed. The elastomeric member having a shear modulus gradient may be readily prepared, e.g., by mixing an optically transparent elastomeric substance and an optically transparent inorganic substance to form a gradient of concentration of the inorganic substance. The concentration gradient of the inorganic substance may be formed, e.g., by utilizing sedimentation or gravitational force.

Preferable examples of the inorganic substance include optically transparent substances such as silica gel and transparent alumina. Particularly preferred examples include a silica such as fumed silica, and silica gel. The silica need not be composed of silicon dioxide ($SiO_2$) alone but may be in the form of a hydrate or contain an alkaline metal, an alkaline earth metal, a transition metal, a rare earth metal, etc. Further, a silica subjected to a lipophilicity-imparting treatment for neutralizing silanol groups (Si—OH) as observed in silica gel, etc., may also be suitably used. It is also possible to introduce an organic functional group to the surface of a silica substance by treatment with a series of organic silane compounds generally referred to as silane coupling agents represented by, e.g., trimethylchlorosilane, vinyltrimethoxysilane, and γ-glycidoxypropyltrimethylsilane, or organic titanium compounds referred to as "titanate coupling agents".

The inorganic substance may be used in any desired shapes inclusive of granules or crushed or pulverized particles. Generally, the inorganic substance may suitably be in the form of powder or particles inclusive of particles having shapes as described above, which preferably have an average particle size of 50 μm or below, further preferably 0.5–50 μm, particularly 1–20 μm in order to prevent scattering of light. The amount of the inorganic substance mixed with the elastomeric substance may suitably be on the order of 0.5–30 parts by weight per 100 parts by weight of the elastomeric substance while it depends on a desired shear modulus gradient.

The elastomeric substance to be used in the present invention may be selected from a wide variety of elastomeric substances inclusive of polymeric substances such as polysiloxanes and rubber having not only a property of causing a shape change through a strain in response to an applied stress but also a reversibility of restoring the original shape through release of the strain when the stress is removed. Among these, polysiloxanes are particularly suitable because they have a high shear modulus and also have excellent optical characteristics, and further their mechanical strengths such as tensile strength and tear strength may be increased by incorporating the inorganic substance as described above, particularly a silica.

An elastomeric member obtained by mixing a silica with a polysiloxane can have improved physical properties over an elastomeric member composed of the polysiloxane alone, e.g., a tensile strength of up to about 50 times, a tear strength of up to about 6–7 times and an elongation (at breakage) of up to about 5 times, respectively, those of the polysiloxane alone, and can also have a shear modulus in a wide range of $5 \times 10^3$ dyne/cm$^2$–$10^9$ dyne/cm$^2$.

Typical examples of the polysiloxanes include polysiloxane compounds such as polydimethylsiloxane, poly(dimethylsiloxane - polydiphenylsiloxane) copolymer, polymethylphenylsiloxane, and poly(dimethyldiphenylmethylphenyl)siloxane copolymer. These compounds can be used either singly or in combination of two or more species. These polysiloxanes may have been modified or denaturated with an organic functional group such as carboxyl, amine or vinyl group. Such polysiloxanes modified with an organic functional group are preferable because they can provide rich shapability to the elastomeric member by exhibiting various types of curing or hardening characteristics in response to heat, light, etc.

Examples of elastomeric substances capable of constituting the elastomeric member may include polybutadiene, polychloroprene, polyisoprene, and a so-called acryl gel which comprises a crosslinked polymer of acrylic acid, methacrylic acid or a combination of these swollen with water or an organic solvent.

The optical device according to the present invention may be driven, e.g., by exerting a force mechanically onto the deforming member 3.

Hereinbelow, the present invention will be explained with reference to a specific example of preparation of a variable-focus modulation device.

EXAMPLE

A variable-focus optical device as exemplified in FIG. 1 was prepared.

The elastomeric member 1 was prepared in the following manner. Polydimethylsiloxane (KE 106, mfd. by Shinetsu Kagaku Kogyo K. K.) in an amount of 100 parts by weight and 20 parts of silica gel (Siloid, mfd. by Fuji Devison K. K.) were sufficiently mixed at room temperature, and the mixture was charged in a mold having an inner sectional shape of the elastomeric member 1 as shown in FIG. 1. The mold had dimensions adapted to provide an elastomeric member having a thickness of 10 mm along the optical axis, a longitudinal length of 50 mm, and a transverse length of 10 mm. The elastomeric mixture in the mold was placed in a centrifugal separator so that its face forming the aperture surface was caused to face outwardly with respect to the rotation axis of the centrifugal separator. The separator was then rotated at a rate of 12000 rpm to provide a concentration gradient of the silica gel in the mixture, which was then cured at 120° C. to obtain an elastomeric member 1.

Separately, a sample for measurement of shear modulus of the elastomeric member was prepared in the same manner. The sample elastomeric member 1 was cooled with liquid nitrogen, and 3 sample films of respectively 20 μm in thickness were cut out from an upper layer, a middle layer (just the mid thickness) and a lower layer in a direction from the aperture face toward the supporting plate 2. The three sample films were subjected to measurement by means of a tensile tester, whereby the shear modulus of the three sample films from the upper, middle and lower layers were measured and calculated to be $2.4 \times 10^7$, $6 \times 10^6$ and $1.1 \times 10^6$ dyne/cm$^2$.

To the thus obtained elastomeric member 1, a glass supporting plate 2 and an aperture plate 3 were affixed, thereby to complete a variable-focus optical device as shown in FIG. 1.

The finally obtained optical device had a spherical aperture face with a curvature radius of 50 mm, a length a of 25 mm, and an aperture diameter b of 20 mm.

With respect to the thus obtained optical device, the surface shape of the elastomeric member 1 was changed by pressing the glass plate 3 thereagainst, whereby the elastomeric member 1 was deformed while retaining an exactly spherical surface with a curvature radius in the range of 25–110 mm.

COMPARATIVE EXAMPLE

A variable-focus optical device as shown in FIG. 1 was prepared in the same manner as in Example 1 except that the silica was not mixed in the elastomeric member 1 or the elastomeric member was not provided with a shear modulus gradient. When the glass aperture plate was pressed against the elastomeric member to change the surface shape, the resultant surface showed a stronger curvature near the aperture periphery, thus failing to obtain a uniform spherical shape.

As described hereinabove, according to the present invention, there is provided a variable-focus optical device which can provide a variable-focus optical surface while retaining a spherical or desired aspherical surface on deformation.

What is claimed is:

1. A variable-focus optical device comprising: an elastomeric member having a gradient of shear modulus inside thereof along its optical axis, and a deforming member having an aperture adapted for causing projection or sinking of the elastomeric member therethrough or thereat to deform the surface of the elastomeric member.

2. An optical device according to claim 1, wherein said gradient of shear modulus of the elastomeric member continuously decreases from the surface of the elastomeric member adjacent the aperture toward the inside of the elastomeric member.

3. An optical device according to claim 1, wherein the shear modulus of the elastomeric member is in the range of $10^4$–$10^8$ dyne/cm$^2$.

4. An optical device according to claim 1, wherein the shear modulus of the elastomeric member is in the range of $10^4$–$10^7$ dyne/cm$^2$.

5. An optical device according to claim 1, wherein said elastomeric member comprises an elastomeric substance and an inorganic substance, and said gradient of shear modulus is provided by a gradient of concentration of the inorganic substance in the elastomeric member along the optical axis.

6. An optical device according to claim 5, wherein said inorganic substance is in the form of particles having an average particle size in the range of 0.5–50 μm.

7. An optical device according to claim 5, wherein said inorganic substance is in the form of particles having an average particle size in the range of 1 to 20 μm.

8. An optical device according to claim 5, wherein said inorganic substance is contained in an amount of 0.5–30 parts by weight per 100 parts by weight of the elastomeric substance.

9. An optical device according to claim 5, wherein said inorganic substance comprises silica.

10. An optical device according to claim 5, wherein said elastomeric substance comprises polysiloxane. siloxane.

11. An optical device according to claim 5, wherein said inorganic substance comprises silica, and said elastomeric substance comprises polysiloxane. siloxane.

12. An optical device according to claim 1, wherein said gradient of shear modulus of the elastomeric member continuously decreases unidirectionally from the surface of the elastomeric member adjacent the aperture toward the inside of the elastomeric member.

* * * * *

UNITED STATES PATENT AND TRADEMARK OFFICE
CERTIFICATE OF CORRECTION

PATENT NO. : 4,783,153
DATED : November 8, 1988
INVENTOR(S) : NOBUO KUSHIBIKI, ET AL.

It is certified that error appears in the above-identified patent and that said Letters Patent is hereby corrected as shown below:

Cover Page,

[56], Assistant Examiner, "Kachmavik" should read --Kachmarik--;

[57], Abstract, last line, "polysilioxane" should read --polysiloxane--.

Column 2, line 32, "modulus" should read --moduli--.

Column 5, line 53, "modulus" should read --moduli--.

Column 6, lines 57-58, "siloxane." should be deleted;
line 61, "siloxane." should be deleted.

Signed and Sealed this

Seventh Day of March, 1989

*Attest:*

DONALD J. QUIGG

*Attesting Officer*  *Commissioner of Patents and Trademarks*